United States Patent
Kawakami

(10) Patent No.: US 12,281,014 B2
(45) Date of Patent: Apr. 22, 2025

(54) FIBROUS CARBON NANOSTRUCTURE AND METHOD OF PRODUCING SURFACE-MODIFIED FIBROUS CARBON NANOSTRUCTURE

(71) Applicant: ZEON CORPORATION, Tokyo (JP)

(72) Inventor: Osamu Kawakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 315 days.

(21) Appl. No.: 17/757,315

(22) PCT Filed: Dec. 15, 2020

(86) PCT No.: PCT/JP2020/046810
§ 371 (c)(1),
(2) Date: Jun. 14, 2022

(87) PCT Pub. No.: WO2021/131920
PCT Pub. Date: Jul. 1, 2021

(65) Prior Publication Data
US 2022/0371895 A1 Nov. 24, 2022

(30) Foreign Application Priority Data
Dec. 27, 2019 (JP) .................. 2019-239801

(51) Int. Cl.
*B32B 9/00* (2006.01)
*C01B 32/159* (2017.01)
*C01B 32/174* (2017.01)
*B82Y 30/00* (2011.01)

(52) U.S. Cl.
CPC .......... *C01B 32/174* (2017.08); *C01B 32/159* (2017.08); *B82Y 30/00* (2013.01); *C01B 2202/02* (2013.01); *Y10T 428/30* (2015.01)

(58) Field of Classification Search
CPC ....... Y10T 428/30; B82Y 30/00; B82Y 40/00; C01B 32/174; C01B 32/159
USPC ....................................... 428/408
See application file for complete search history.

(56) References Cited

U.S. PATENT DOCUMENTS

| 10,207,929 B2 | 2/2019 | Yamagishi et al. |
| 11,358,866 B2 | 6/2022 | Kawakami |
| 2010/0187485 A1* | 7/2010 | Kitano ............. C01B 32/174 977/750 |
| 2017/0369319 A1 | 12/2017 | Yamagishi et al. |

FOREIGN PATENT DOCUMENTS

| CN | 107001046 A | 8/2017 |
| JP | 2003013330 A | 1/2003 |
| JP | 2004143652 A | 5/2004 |
| JP | 2016183395 A | 10/2016 |
| WO | 2016103706 A1 | 6/2016 |
| WO | 2018043487 A1 | 3/2018 |
| WO | 2019124026 A1 | 6/2019 |

OTHER PUBLICATIONS

Guohai, Highly pure, millimeter-tall, sub-2-nanometer diameter single-walled carbon nanotube forests, Carbon 107(2016) 433-439.*
Jun. 28, 2022, International Preliminary Report on Patentability issued in the International Patent Application No. PCT/JP2020/046810.
Mar. 2, 2021, International Search Report issued in the International Patent Application No. PCT/JP2020/046810.
William D. Rice et al., Enhancement of the Electron Spin Resonance of Single-Walled Carbon Nanotubes by Oxygen Removal, ACS Nano 2012, Feb. 12, 2012, pp. 2165-2173, vol. 6, No. 3.
Oct. 8, 2024, Notification of Reasons for Refusal issued by the Japan Patent Office in the corresponding Japanese Patent Application No. 2021-567315.
Yoji Yamaguchi et al., Evaluation of Carbon Materials by ESR, The TRC News, Jul. 2016, 201607-03, pp. 1-4.

* cited by examiner

*Primary Examiner* — Daniel H Miller
(74) *Attorney, Agent, or Firm* — KENJA IP LAW PC

(57) ABSTRACT

Provided is a fibrous carbon nanostructure that has excellent dispersibility after surface modification treatment. The fibrous carbon nanostructure has an amount of localized electrons of $1.0 \times 10^{17}$/g or more as determined by electron spin resonance measurement at a temperature of 10 K.

7 Claims, No Drawings

FIBROUS CARBON NANOSTRUCTURE AND METHOD OF PRODUCING SURFACE-MODIFIED FIBROUS CARBON NANOSTRUCTURE

TECHNICAL FIELD

The present disclosure relates to a fibrous carbon nanostructure and a method of producing a surface-modified fibrous carbon nanostructure.

BACKGROUND

Fibrous carbon nanostructures such as carbon nanotubes (hereinafter, also referred to as "CNTs") have been attracting interest in recent years as materials having excellent electrical conductivity, thermal conductivity, and mechanical characteristics.

However, fibrous carbon nanostructures such as CNTs readily form bundle structures through Van der Waals forces and the like and are difficult to disperse in solvents, which has, for example, resulted in cases in which characteristics such as electrical conductivity cannot be adequately displayed.

For this reason, much effort is being focused on the development of techniques for obtaining surface-modified fibrous carbon nanostructures having enhanced dispersibility through various types of surface modification treatment performed with respect to fibrous carbon nanostructures such as CNTs.

As one example, Patent Literature (PTL) 1 proposes a technique of performing liquid phase oxidation treatment as surface modification treatment with respect to CNTs having an intensity ratio (G/D ratio) of a G band and a D band in Raman spectroscopy of 50 or more so as to increase dispersibility of the CNTs in a solvent.

CITATION LIST

Patent Literature

PTL 1: WO2018/043487A1

SUMMARY

Technical Problem

However, studies carried out by the inventor revealed that there is room for improvement of fibrous carbon nanostructures used in the surface modification treatment of the conventional technique described above in terms of dispersibility after surface modification treatment.

Accordingly, one object of the present disclosure is to provide a fibrous carbon nanostructure that has excellent dispersibility after surface modification treatment.

Another object of the present disclosure is to provide a surface-modified fibrous carbon nanostructure that has excellent dispersibility.

Solution to Problem

The inventor conducted diligent studies with the aim of achieving the objects set forth above. The inventor discovered that a fibrous carbon nanostructure having an amount of localized electrons, as determined by electron spin resonance measurement at a temperature of 10 K, that is not less than a specific value has excellent dispersibility after surface modification treatment, and, in this manner, completed the present disclosure.

Specifically, the present disclosure aims to advantageously solve the problem set forth above, and a presently disclosed fibrous carbon nanostructure has an amount of localized electrons of $1.0 \times 10^{17}$/g or more as determined by electron spin resonance measurement at a temperature of 10 K. A fibrous carbon nanostructure having an amount of localized electrons, as determined by electron spin resonance measurement at a temperature of 10 K, that is not less than a specific value in this manner has excellent dispersibility after surface modification treatment.

Note that the amount of localized electrons of a fibrous carbon nanostructure as determined by electron spin resonance measurement at a temperature of 10 K can be measured by a method described in the EXAMPLES section of the present specification.

The presently disclosed fibrous carbon nanostructure preferably has a G/D ratio of G band peak intensity relative to D band peak intensity in a Raman spectrum of not less than 0.5 and not more than 5.0. Through the G/D ratio being within the specific range set forth above, dispersibility of the fibrous carbon nanostructure after surface modification treatment can be further increased. As a result, the fibrous carbon nanostructure can display particularly good characteristics (for example, electrical conductivity, thermal conductivity, and strength; hereinafter, also referred to simply as "characteristics") after surface modification treatment.

Note that the ratio (G/D ratio) of G band peak intensity relative to D band peak intensity in a Raman spectrum can be measured by a method described in the EXAMPLES section of the present specification.

In the presently disclosed fibrous carbon nanostructure, the amount of localized electrons is preferably less than $1.0 \times 10^{19}$/g. Through the amount of localized electrons being less than the specific value set forth above, it is possible to inhibit loss of the fibrous carbon nanostructure after surface modification treatment and efficiently obtain a surface-modified fibrous carbon nanostructure in a situation in which the fibrous carbon nanostructure is subjected to surface modification treatment.

It is preferable that a t-plot for the presently disclosed fibrous carbon nanostructure obtained from an adsorption isotherm exhibits a convex upward shape. Through a t-plot for the fibrous carbon nanostructure obtained from an adsorption isotherm exhibiting a convex upward shape, the fibrous carbon nanostructure can display particularly good characteristics when dispersibility thereof is increased through surface modification treatment.

The presently disclosed fibrous carbon nanostructure preferably comprises a carbon nanotube. Through the fibrous carbon nanostructure including a carbon nanotube, the fibrous carbon nanostructure can display excellent characteristics when dispersibility thereof is increased through surface modification treatment.

For the presently disclosed fibrous carbon nanostructure, it is preferable that the carbon nanotube includes a single-walled carbon nanotube. Through the fibrous carbon nanostructure including a single-walled carbon nanotube as a carbon nanotube, the fibrous carbon nanostructure can display particularly good characteristics when dispersibility thereof is increased through surface modification treatment.

Moreover, the present disclosure aims to advantageously solve the problem set forth above, and a presently disclosed method of producing a surface-modified fibrous carbon nanostructure comprises performing surface modification treatment of any one of the fibrous carbon nanostructures set forth above to obtain a surface-modified fibrous carbon nanostructure. Through the presently disclosed method of producing a surface-modified fibrous carbon nanostructure, it is possible to produce a surface-modified fibrous carbon nanostructure that has excellent dispersibility.

In the presently disclosed method of producing a surface-modified fibrous carbon nanostructure, the surface modification treatment is preferably wet oxidation treatment. Through wet oxidation treatment being used as the surface modification treatment, dispersibility of a produced surface-modified fibrous carbon nanostructure can be further increased.

Advantageous Effect

According to the present disclosure, it is possible to provide a fibrous carbon nanostructure that has excellent dispersibility after surface modification treatment.

Moreover, according to the present disclosure, it is possible to provide a surface-modified fibrous carbon nanostructure that has excellent dispersibility.

DETAILED DESCRIPTION

The following provides a detailed description of embodiments of the present disclosure.
(Fibrous Carbon Nanostructure)

A feature of one or more presently disclosed fibrous carbon nanostructures is that they have an amount of localized electrons, as determined by electron spin resonance measurement at a temperature of 10 K, that is not less than a specific value. The presently disclosed fibrous carbon nanostructures have excellent dispersibility after surface modification treatment as a result of the amount of localized electrons being not less than a specific value. Accordingly, surface-modified fibrous carbon nanostructures that are obtained through surface modification treatment of the presently disclosed fibrous carbon nanostructures can display excellent dispersibility in a solvent such as water. As a consequence, when an obtained dispersion liquid of the surface-modified fibrous carbon nanostructures is used to form various shaped products (for example, films such as antistatic films and conductive films), the amount of clumps in these shaped products can be reduced. Accordingly, a formed shaped product that contains the surface-modified fibrous carbon nanostructures has excellent characteristics such as electrical conductivity, thermal conductivity, and strength. In other words, surface-modified carbon nanostructures that are obtained through surface modification treatment of the presently disclosed fibrous carbon nanostructures can be said to excel in terms of the above-described characteristics.

The fibrous carbon nanostructures may, without any specific limitations, be circular tube shaped carbon nanostructures such as CNTs or non-circular tube shaped carbon nanostructures such as carbon nanostructures resulting from a six-membered ring network of carbon being formed in a flattened tube shape, for example. Note that the presently disclosed fibrous carbon nanostructures may include one of the types of carbon nanostructures described above or may include two or more of the types of carbon nanostructures described above.

The fibrous carbon nanostructures preferably include CNTs. This is because CNTs can display excellent characteristics (for example, electrical conductivity, thermal conductivity, and strength) when dispersibility thereof is increased through surface modification treatment. Note that the fibrous carbon nanostructures including CNTs may be composed of just CNTs or may be a mixture of CNTs and fibrous carbon nanostructures other than CNTs.

Single-walled carbon nanotubes and/or multi-walled carbon nanotubes can be used as the CNTs without any specific limitations. The CNTs are preferably carbon nanotubes having from one to five walls, and are more preferably single-walled carbon nanotubes. This is because CNTs having fewer walls can display particularly good characteristics when dispersibility thereof is increased through surface modification treatment.

The amount of localized electrons in the presently disclosed fibrous carbon nanostructures, as determined by electron spin resonance measurement at a temperature of 10 K, is required to be $1.0 \times 10^{17}$/g or more, is preferably $3.0 \times 10^{17}$/g or more, more preferably $5.0 \times 10^{17}$/g or more, even more preferably $1.0 \times 10^{18}$/g or more, and further preferably $5.6 \times 10^{18}$/g or more, and is preferably less than $1.0 \times 10^{19}$/g, and more preferably less than $8.0 \times 10^{18}$/g. When the amount of localized electrons determined by electron spin resonance measurement at a temperature of 10 K is not less than any of the lower limits set forth above, dispersibility of the fibrous carbon nanostructures after surface modification treatment can be sufficiently increased. On the other hand, when the amount of localized electrons determined by electron spin resonance measurement at a temperature of 10 K is not more than any of the upper limits set forth above, it is possible to inhibit loss of the fibrous carbon nanostructures and efficiently obtain surface-modified fibrous carbon nanostructures in a situation in which the fibrous carbon nanostructures are subjected to surface modification treatment.

Note that the amount of localized electrons in the fibrous carbon nanostructures as determined by electron spin resonance measurement at a temperature of 10 K can be adjusted, for example, through the thickness of an iron thin film (catalyst layer) on a catalyst substrate that is used in a production method of the fibrous carbon nanostructures.

The average diameter of the fibrous carbon nanostructures is preferably 1 nm or more, and is preferably 60 nm or less. Moreover, the average diameter of the fibrous carbon nanostructures may be 2 nm or more, may be 3 nm or more, may be 30 nm or less, may be 10 nm or less, or may be 5 nm or less. Fibrous carbon nanostructures having an average diameter within any of the specific ranges set forth above can display particularly good characteristics when dispersibility thereof is increased through surface modification treatment.

Note that the "average diameter of the fibrous carbon nanostructures" can be determined by measuring the diameters (external diameters) of 20 fibrous carbon nanostructures, for example, in a transmission electron microscope (TEM) image, and then calculating a number-average value of the measured diameters.

The fibrous carbon nanostructures are preferably fibrous carbon nanostructures for which a ratio ($3\sigma$/Av) of a value $3\sigma$ (value obtained by multiplying the diameter standard deviation ($\sigma$: sample standard deviation) by 3) relative to the average diameter (Av) is more than 0.20 and less than 0.80, more preferably fibrous carbon nanostructures for which $3\sigma$/Av is more than 0.25, and even more preferably fibrous carbon nanostructures for which $3\sigma$/Av is more than 0.50. Fibrous carbon nanostructures for which $3\sigma$/Av is more than 0.20 and less than 0.80 can display particularly good characteristics when dispersibility thereof is increased through surface modification treatment.

The average diameter (Av) and the standard deviation ($\sigma$) of the fibrous carbon nanostructures may be adjusted by changing the production method and the production conditions of the fibrous carbon nanostructures, or may be adjusted by combining a plurality of types of fibrous carbon nanostructures obtained by different production methods.

The average length of the fibrous carbon nanostructures is preferably 10 μm or more, more preferably 50 μm or more, and even more preferably 80 μm or more, and is preferably 600 μm or less, more preferably 550 μm or less, and even more preferably 500 μm or less. Fibrous carbon nanostructures having an average length within any of the specific ranges set forth above can display particularly good characteristics when dispersibility thereof is increased through surface modification treatment.

Note that the "average length of the fibrous carbon nanostructures" can be determined by measuring the lengths of 20 fibrous carbon nanostructures, for example, in a scanning electron microscope (SEM) image, and then calculating a number-average value of the measured lengths.

The fibrous carbon nanostructures normally have an aspect ratio of more than 10. Note that the aspect ratio of the fibrous carbon nanostructures can be determined by measuring the diameters and lengths of 20 randomly selected fibrous carbon nanostructures using a scanning electron microscope or a transmission electron microscope, and then calculating an average value of the ratio of diameter and length (length/diameter).

The BET specific surface area of the fibrous carbon nanostructures is preferably 600 $m^2/g$ or more, and more preferably 800 $m^2/g$ or more, is preferably 2,000 $m^2/g$ or less, more preferably 1,800 $m^2/g$ or less, and even more preferably 1,600 $m^2/g$ or less, and may be 1,100 $m^2/g$ or less, or 1,000 $m^2/g$ or less. Fibrous carbon nanostructures having a BET specific surface area of 600 $m^2/g$ or more can display particularly good characteristics when dispersibility thereof is increased through surface modification treatment. Moreover, fibrous carbon nanostructures having a BET specific surface area of 2,000 $m^2/g$ or less can display even better dispersibility after surface modification treatment.

A t-plot for the fibrous carbon nanostructures obtained from an adsorption isotherm preferably exhibits a convex upward shape. Fibrous carbon nanostructures for which a t-plot exhibits a convex upward shape can display particularly good characteristics when dispersibility thereof is increased through surface modification treatment. Furthermore, it is more preferable that the fibrous carbon nanostructures have not undergone opening formation treatment and that a t-plot for the fibrous carbon nanostructures exhibits a convex upward shape.

Note that a "t-plot" can be obtained by, in an adsorption isotherm of the fibrous carbon nanostructures measured by the nitrogen gas adsorption method, converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

In a substance having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface
(2) A process in which a multi-molecule adsorption layer is formed and is accompanied by capillary condensation filling of pores
(3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that many openings are present in carbon nanostructures constituting the fibrous carbon nanostructures.

A bending point of the t-plot for the fibrous carbon nanostructures is preferably within a range satisfying 0.2≤t (nm)≤1.5, more preferably within a range of 0.45≤t (nm) ≤1.5, and even more preferably within a range of 0.55≤t (nm)≤1.0. Fibrous carbon nanostructures having a t-plot bending point within any of the specific ranges set forth above can display particularly good characteristics when dispersibility thereof is increased through surface modification treatment.

The "position of the bending point" is defined as an intersection point of a linear approximation A for the above-described process (1) and a linear approximation B for the above-described process (3).

A ratio (S2/S1) of internal specific surface area S2 relative to total specific surface area S1 obtained from the t-plot for the fibrous carbon nanostructures is preferably 0.05 or more, more preferably 0.07 or more, and even more preferably 0.10 or more, and is preferably 0.30 or less. Fibrous carbon nanostructures having an S2/S1 value within any of the specific ranges set forth above can display particularly good characteristics when dispersibility thereof is increased through surface modification treatment.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of the total specific surface area S1 and the internal specific surface area S2 based on t-plot analysis can be performed using a BELSORP®-mini (BELSORP is a registered trademark in Japan, other countries, or both), for example, which is a commercially available measurement apparatus produced by Bel Japan Inc.

Moreover, the fibrous carbon nanostructures including CNTs that are suitable as the fibrous carbon nanostructures preferably have a radial breathing mode (RBM) peak when evaluated by Raman spectroscopy. Note that an RBM is not present in the Raman spectrum of fibrous carbon nanostructures composed of only multi-walled carbon nanotubes having three or more walls.

The presently disclosed fibrous carbon nanostructures preferably have a ratio (G/D ratio) of G band peak intensity relative to D band peak intensity in a Raman spectrum of not less than 0.5 and not more than 5.0. The G/D ratio may be 1.5 or more, 2.0 or more, 2.5 or more, or 3.0 or more, and may be 4.5 or less, 4.0 or less, or 3.4 or less. Fibrous carbon nanostructures having a G/D ratio of not less than 0.5 and not more than 5.0 can display particularly good characteristics when dispersibility thereof is increased through surface modification treatment.

The carbon purity of the fibrous carbon nanostructures is preferably 98 mass % or more, more preferably 99 mass % or more, and even more preferably 99.9 mass % or more.

Note that the "carbon purity" can be determined by a method described in the EXAMPLES section of the present specification.

(Production Method of Fibrous Carbon Nanostructures)

The presently disclosed fibrous carbon nanostructures set forth above can be efficiently produced by, in a method in which, during synthesis of fibrous carbon nanostructures through CVD by supplying a feedstock compound and a carrier gas onto a substrate (catalyst substrate) having a catalyst layer at the surface thereof, a trace amount of an oxidizing agent (catalyst activating material) is provided in the system to dramatically improve catalytic activity of the catalyst layer (for example, refer to WO2006/011655A1), forming the catalyst layer at the surface of the substrate by a wet process and using a feedstock gas containing ethylene as a feedstock compound (for example, a gas containing more than 10 volume % of ethylene), for example.

A formation step of providing a reducing gas environment as a surrounding environment of the catalyst layer (for example, a range of 5 cm or less in distance from the catalyst layer) and heating the catalyst layer and/or the reducing gas may optionally be implemented prior to a synthesis step in which the feedstock compound and the carrier gas are supplied to the catalyst substrate and fibrous carbon nanostructures are synthesized by CVD. The formation step brings about one or more effects among reduction of a catalyst in the catalyst layer, promotion of micronization of the catalyst (conversion to a state suitable for carbon structure growth), and improvement of catalyst activity.

A cooling step of cooling the synthesized fibrous carbon nanostructures and the catalyst layer in an inert gas may optionally be implemented after the synthesis step. Oxidation of the fibrous carbon nanostructures and the catalyst in the catalyst layer can be prevented by implementing this cooling step.

The formation step and the cooling step can, for example, be performed in accordance with descriptions in WO2014/208097A1 and JP2011-219316A.

The catalyst substrate used in the production method of the fibrous carbon nanostructures set forth above may include, on the substrate, a catalyst layer and a catalyst-supporting layer that supports the catalyst layer, for example. The catalyst layer is preferably an iron thin film, and the catalyst-supporting layer is preferably an aluminum thin film. Note that the term "iron thin film" refers to a thin film that contains metal iron and/or an iron compound, whereas the term "aluminum thin film" refers to a thin film that contains metal aluminum and/or an aluminum compound.

Formation of the catalyst layer on the surface of the substrate by a wet process in production of the catalyst substrate including the catalyst layer can be performed by, for example, applying a coating liquid A containing an aluminum compound onto the substrate, drying a coating film of the coating liquid A to form an aluminum thin film (catalyst-supporting layer) on the substrate, further applying a coating liquid B containing an iron compound onto the aluminum thin film, and drying a coating film of the coating liquid B to form an iron thin film (catalyst layer) on the aluminum thin film.

The substrate can, for example, be a substrate formed of a metal such as iron, nickel, chromium, molybdenum, tungsten, titanium, aluminum, manganese, cobalt, copper, silver, gold, platinum, niobium, tantalum, lead, zinc, gallium, indium, germanium, or antimony, a substrate formed of an alloy or an oxide of any of these metals, a substrate formed of a non-metal such as silicon, quartz, glass, mica, graphite, or diamond, or a substrate formed of a ceramic.

The coating liquid A can be a coating liquid obtained by dissolving or dispersing an aluminum compound (organoaluminum compound and/or aluminum salt, etc.) that can form an alumina thin film as an aluminum thin film in an organic solvent. Note that the concentration of the aluminum compound in the coating liquid A can be adjusted as appropriate to the extent that the desired effects are obtained.

Examples of organoaluminum compounds that can form an alumina thin film include aluminum alkoxides such as aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. Other examples of organoaluminum compounds that can form an alumina thin film include aluminum complexes such as tris(acetylacetonato)aluminum(III). Examples of aluminum salts that can form an alumina thin film include aluminum sulfate, aluminum chloride, aluminum nitrate, aluminum bromide, aluminum iodide, aluminum lactate, basic aluminum chloride, and basic aluminum nitrate.

Note that one of these aluminum compounds may be used individually, or a plurality of these aluminum compounds may be used as a mixture.

Organic solvents such as alcohols, glycols, ketones, ethers, esters, and hydrocarbons, for example, can be used as the organic solvent. Note that one of these organic solvents may be used individually, or a plurality of these organic solvents may be used as a mixture.

The coating liquid B can be a coating liquid obtained by dissolving or dispersing an iron compound (organoiron compound and/or iron salt, etc.) that can form an iron thin film in an organic solvent. Note that the concentration of the iron compound in the coating liquid B can be adjusted as appropriate to the extent that the desired effects are obtained.

Examples of organoiron compounds that can form an iron thin film include iron pentacarbonyl, ferrocene, iron(II) acetylacetonate, iron(III) acetylacetonate, iron(II) trifluoroacetylacetonate, and iron(III) trifluoroacetylacetonate. Examples of iron salts that can form an iron thin film include inorganic acid iron salts such as iron sulfate, iron nitrate, iron phosphate, iron chloride, and iron bromide, and organic acid iron salts such as iron acetate, iron oxalate, iron citrate, and iron lactate. Note that one of these iron compounds may be used individually, or a plurality of these iron compounds may be used as a mixture.

The organic solvent contained in the coating liquid B is not specifically limited and can be any of those previously described as organic solvents that can be used in the coating liquid A, for example.

Application and drying of the coating liquids A and B described above can be performed by known techniques.

For example, application of the coating liquid A onto the substrate can be performed by dip coating. More specifically, this can be performed by immersing the substrate in the coating liquid A, subsequently holding the substrate therein, and then pulling up the substrate. Conditions such as the time for which the substrate is held in the coating liquid A and the pulling up speed when the substrate is pulled up from the coating liquid A can be set as appropriate to the extent that the desired effects are obtained. In operations of immersing, holding, and pulling up the substrate with respect to the coating liquid A during dip coating, the angle formed by a surface direction of a liquid surface of the coating liquid A and a surface direction of the substrate is not specifically limited and can be set as 90° (i.e., a right angle), for example.

Moreover, conditions such as temperature and drying time during drying of the coating film of the coating liquid A that is formed on the substrate can be set as appropriate to the extent that the desired effects are obtained.

The thickness of the aluminum thin film that is formed on the substrate can, for example, be set as not less than 10 nm and not more than 100 nm.

Note that the thickness of the aluminum thin film can be adjusted through the pulling up speed when the substrate is pulled up from the coating liquid A, for example.

Application of the coating liquid B onto the aluminum thin film that has been formed on the substrate can also be performed by dip coating, for example. More specifically, this can be performed by immersing the substrate on which the aluminum thin film has been formed in the coating liquid B, subsequently holding the substrate therein, and then pulling up the substrate. In operations of immersing, holding, and pulling up the substrate with respect to the coating liquid B during dip coating, the angle formed by a surface direction of a liquid surface of the coating liquid B and a surface direction of the substrate is not specifically limited and can be set as 90° (i.e., a right angle), for example.

The time for which the substrate having the aluminum thin film formed thereon is held in the coating liquid B can be set as not less than 5 seconds and not more than 60 seconds, for example.

Moreover, the pulling up speed when the substrate having the aluminum thin film formed thereon is pulled up from the coating liquid B is preferably 1 mm/s or more, more preferably 2 mm/s or more, and even more preferably 3 mm/s or more, and is preferably 18 mm/s or less, more preferably 12 mm/s or less, and even more preferably 8 mm/s or less. When the pulling up speed from the coating liquid B is not less than any of the lower limits set forth above, the specific amount of localized electrons in the produced fibrous carbon nanostructures can be suitably reduced because the thickness of the formed iron thin film can be suitably increased. On the other hand, when the pulling up speed from the coating liquid B is not more than any of the upper limits set forth above, the specific amount of localized electrons in the produced fibrous carbon nanostructures can be suitably increased because the thickness of the formed iron thin film can be suitably reduced. Therefore, by setting the pulling up speed within any of the specific ranges set forth above when the substrate having the aluminum thin film formed thereon is pulled up from the coating liquid B, it is possible to set the formed iron thin film as an appropriate thickness, thereby making it easy to adjust the amount of localized electrons in the produced fibrous carbon nanostructures to within any of the previously described specific ranges.

Note that conditions such as temperature and drying time during drying of the coating film of the coating liquid B that is formed on the aluminum thin film can be set as appropriate to the extent that the desired effects are obtained.

The thickness of the iron thin film that is formed on the aluminum thin film is preferably 0.5 nm or more, more preferably 1 nm or more, and even more preferably 2 nm or more, and is preferably 4.5 nm or less, more preferably 4 nm or less, and even more preferably 3.5 nm or less. When the thickness of the iron thin film is not less than any of the lower limits set forth above, the specific amount of localized electrons in the produced fibrous carbon nanostructures can be suitably reduced. On the other hand, when the thickness of the iron thin film is not more than any of the upper limits set forth above, the specific amount of localized electrons in the produced fibrous carbon nanostructures can be suitably increased. Therefore, when the thickness of the iron thin film is within any of the specific ranges set forth above, the specific amount of localized electrons in the produced fibrous carbon nanostructures can easily be adjusted to within any the previously described specific ranges.

Note that the thickness of the thin film can be adjusted through the pulling up speed when the substrate having the aluminum thin film formed thereon is pulled up from the coating liquid B, for example.

(Method of Producing Surface-Modified Fibrous Carbon Nanostructure)

A feature of the presently disclosed method of producing a surface-modified fibrous carbon nanostructure is that it includes a step (surface modification treatment step) of performing surface modification treatment of one or more presently disclosed fibrous carbon nanostructures set forth above to obtain one or more surface-modified fibrous carbon nanostructures. Through the presently disclosed method of producing a surface-modified fibrous carbon nanostructure, it is possible to produce a surface-modified fibrous carbon nanostructure that has excellent dispersibility.

Note that the presently disclosed method of producing a surface-modified fibrous carbon nanostructure may optionally further include steps other than the surface modification treatment step.

<Surface Modification Treatment Step>

In the surface modification treatment step, surface modification treatment is performed with respect to the fibrous carbon nanostructures so as to obtain surface-modified fibrous carbon nanostructures.

The surface modification treatment can be wet treatment, dry treatment, or the like without any specific limitations.

Wet treatment can be performed using a surface modifying agent such as nitric acid, sulfuric acid, a mixed acid of nitric acid and sulfuric acid, or hydrogen peroxide, for example. Dry treatment can be performed using a surface modifying agent such as oxygen, ozone, or fluorine gas, for example.

Of these examples, wet oxidation treatment using nitric acid, sulfuric acid, or a mixed acid of nitric acid and sulfuric acid is preferable as the surface modification treatment from a viewpoint of obtaining surface-modified fibrous carbon nanostructures having even better dispersibility.

Note that the surface modification treatment conditions can be set in accordance with the type of surface modifying agent that is used and the desired properties of the surface-modified fibrous carbon nanostructures.

<Surface-Modified Fibrous Carbon Nanostructures>

Surface-modified fibrous carbon nanostructures that are obtained through surface modification treatment of the presently disclosed fibrous carbon nanostructures can be dispersed well in a solvent such as water even without using a dispersant, for example. Moreover, the resultant dispersion liquid of the surface-modified fibrous carbon nanostructures can be used in production of various shaped products (for example, films such as antistatic films and conductive films).

As a consequence of the surface-modified fibrous carbon nanostructures being dispersed well in the solvent in the dispersion liquid of the surface-modified fibrous carbon nanostructures, it is possible to reduce the amount of clumps in a shaped product that is produced using this dispersion liquid. Accordingly, a produced shaped product that contains the surface-modified fibrous carbon nanostructures has excellent characteristics such as electrical conductivity, thermal conductivity, and strength. In other words, the surface-modified carbon nanostructures can be said to excel in terms of the above-described characteristics.

EXAMPLES

The following provides a more specific description of the present disclosure based on examples. However, the present disclosure is not limited to these examples. In the following description, % used to express quantities is by mass, unless otherwise specified.

In the examples and comparative examples, the following methods were used to measure or evaluate the G/D ratio, average diameter, BET specific surface area, t-plot, total specific surface area, internal specific surface area, carbon purity, and amount of localized electrons for fibrous carbon nanostructures including CNTs and also the dispersibility thereof after surface modification treatment.

<G/D Ratio>

A microscopic laser Raman system (Nicolet Almega XR produced by Thermo Fisher Scientific) was used to measure fibrous carbon nanostructures in proximity to the center of a substrate.

<Average Diameter>

The diameters (external diameters) of 20 randomly selected fibrous carbon nanostructures were measured from an image obtained using a transmission electron microscope, and a number-average value thereof was determined as the average diameter.

<BET Specific Surface Area, t-Plot, Total Specific Surface Area, and Internal Specific Surface Area>

Measurement was performed using a BET specific surface area measurement apparatus (BELSORP®-mini produced by Bel Japan Inc.).

<Carbon Purity>

Fibrous carbon nanostructures were heated to 800° C. in air using a thermogravimetric (TG) analyzer, and the carbon purity was calculated from the mass loss in this heating (carbon purity=(mass loss through combustion up to 800° C./initial mass)×100(%)).

<Amount of Localized Electrons>

An electron spin resonance spectrometer (Elexsys E580 produced by Bruker Corporation) was used to quantify the amount of localized electrons in fibrous carbon nanostructures from a ratio of signal intensity and sample weight at a temperature of 10 K and using copper sulfate pentahydrate as a reference sample.

<Dispersibility after Surface Modification Treatment>
<<Evaluation of Dispersion Liquid>>

A dispersion liquid of surface-modified fibrous carbon nanostructures was subjected to three cycles of 40 minutes of centrifugal separation at 20,000 G and collection of supernatant using a centrifuge (produced by Beckman Coulter Inc.; product name: OPTIMA XL100K) to obtain 20 mL of a dispersion liquid of surface-modified fibrous carbon nanostructures that had undergone centrifugal separation treatment. This dispersion liquid was visually inspected in order to confirm whether or not clumps were present. When clumps are not visually observed, this indicates that fibrous carbon nanostructures have excellent dispersibility after surface modification treatment.

In addition, the particle diameter of particles present in the dispersion liquid after the centrifugal separation treatment described above was measured using a dynamic light scattering (DLS) particle size distribution meter (produced by Malvern; product name: Zetasizer Nano ZS), and dispersibility of the surface-modified fibrous carbon nanostructures was evaluated. Note that a smaller particle diameter indicates better surface modification of the fibrous carbon nanostructures and better dispersibility thereof after surface modification treatment.

<<Evaluation of Shaped Product (Film)>>

A dispersion liquid of surface-modified fibrous carbon nanostructures was applied onto a glass base plate by a #2 bar coater and was then dried at 130° C. for 10 minutes to form a film formed of the surface-modified fibrous carbon nanostructures on the glass base plate. Dispersibility of the surface-treated fibrous carbon nanostructures was evaluated by observing the obtained film using an optical microscope (×100 magnification) and checking whether visible clumps (30 μm or more in diameter) of surface-treated fibrous carbon nanostructures were present in the field of view of the microscope. When clumps of surface-modified fibrous carbon nanostructures are not observed in the field of view of the microscope, this indicates good surface modification of the fibrous carbon nanostructures and excellent dispersibility thereof after surface modification treatment.

<<Overall Evaluation>>

An evaluation of "Excellent" was given in cases in which clumps were not present in the dispersion liquid of the surface-modified fibrous carbon nanostructures, in which the particle diameter measured using the dynamic light scattering (DLS) particle size distribution meter was 180 nm or less, and in which clumps were not present in the film, and an evaluation of "Poor" was given in other cases.

Example 1

<Production of Catalyst Substrate>

Aluminum tri-sec-butoxide was dissolved in 2-propanol to produce a coating liquid A. In addition, iron acetate was dissolved in 2-propanol to produce a coating liquid B.

The coating liquid A described above was applied onto the surface of a stainless steel base plate serving as a plate-shaped substrate so as to form an alumina thin film (catalyst-supporting layer) of 40 nm in thickness. Next, the coating liquid B described above was applied onto the alumina thin film on the substrate by dip coating with a pulling up speed of 5 mm/s so as to obtain a substrate (catalyst substrate) including an iron thin film of 2 nm in thickness as a catalyst layer.

<Synthesis of Fibrous Carbon Nanostructures>

A formation step (reduction step), a synthesis step, and a cooling step were successively performed with respect to the catalyst substrate described above in order to synthesize an aligned aggregate of fibrous carbon nanostructures (fibrous carbon nanostructures including CNTs). Note that in the formation step, hydrogen gas was supplied to the catalyst substrate so as to perform reduction treatment. Moreover, the synthesis step was implemented by supplying a feedstock gas (containing ethylene gas, nitrogen gas as a carrier gas, and water as an activator) to the catalyst substrate.

The obtained fibrous carbon nanostructures including CNTs had a G/D ratio of 3.8, an average diameter of 4 nm, a BET specific surface area of 1,446 m$^2$/g, and a carbon purity of 99.9%, and in measurement thereof by a Raman spectrophotometer, a radial breathing mode (RBM) peak was observed in a low wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Furthermore, the position of the bending point was at t=0.7 nm, the total specific surface area S1 was 970 m$^2$/g, the internal specific surface area S2 was 170 m$^2$/g, and S2/S1 was 0.18. Also, the amount of localized electrons in the obtained fibrous carbon nanostructures including CNTs at a temperature of 10 K was 5.6×10$^{18}$/g.

<Production of Dispersion Liquid of Surface-Modified Fibrous Carbon Nanostructures>

A 300 mL flask including a condenser and an impeller was charged with 0.80 g of the fibrous carbon nanostructures including CNTs that were obtained as described above, 54.8 g of deionized water, and 83 mL of a mixed acid solution containing sulfuric acid (produced by Wako Pure Chemical Industries, Ltd.; concentration: 96% to 98%) and nitric acid (produced by Wako Pure Chemical Industries, Ltd.; concentration: 69% to 70%) in a ratio of 1:3 (volume ratio). These materials were heated to an internal temperature of 110° C. under stirring for 8 hours in order to perform mixed acid treatment as wet oxidation treatment.

Next, 3.0 g of the fibrous carbon nanostructure/mixed acid liquid obtained after mixed acid treatment was measured into a 50 mL sample bottle and was diluted through addition of 27.0 g of deionized water. Supernatant was removed, and then the liquid volume was adjusted to 30 mL through addition of deionized water. Ammonia water of 0.1% in concentration was added to adjust the pH to 7.0, and then 50 minutes of ultrasonication was performed at a frequency of 42 Hz using an ultrasonication apparatus (produced by Branson; product name: BRANSON 5510) so as to obtain a dispersion liquid of surface-modified fibrous carbon nanostructures.

The obtained dispersion liquid of surface-modified fibrous carbon nanostructures was used to evaluate dispersibility of the fibrous carbon nanostructures after surface modification treatment. The results are shown in Table 1.

Example 2

Synthesis of fibrous carbon nanostructures and production of a dispersion liquid of surface-modified fibrous carbon nanostructures were performed under the same conditions as in Example 1 with the exception that the pulling up speed during application of the coating liquid B onto the alumina thin film provided on the substrate was changed from 5 mm/s to 10 mm/s so as to change the thickness of the iron thin film that was formed from 2 nm to 3 nm. Various measurements and evaluations were performed in the same way as in Example 1.

The obtained fibrous carbon nanostructures including CNTs had a G/D ratio of 2.9, an average diameter of 4 nm, a BET specific surface area of 1,191 m$^2$/g, and a carbon purity of 99.9%, and in measurement thereof by a Raman spectrophotometer, a radial breathing mode (RBM) peak was observed in a low wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Furthermore, the position of the bending point was at t=0.7 nm, the total specific surface area S1 was 840 m$^2$/g, the internal specific surface area S2 was 70 m$^2$/g, and S2/S1 was 0.08. Also, the amount of localized electrons in the obtained fibrous carbon nanostructures including CNTs at a temperature of 10 K was 9.9×10$^{17}$/g.

The obtained dispersion liquid of surface-modified fibrous carbon nanostructures was used to evaluate dispersibility of the fibrous carbon nanostructures after surface modification treatment. The results are shown in Table 1.

Example 3

Synthesis of fibrous carbon nanostructures and production of a dispersion liquid of surface-modified fibrous carbon nanostructures were performed under the same conditions as in Example 1 with the exception that the pulling up speed during application of the coating liquid B onto the alumina thin film provided on the substrate was changed from 5 mm/s to 15 mm/s so as to change the thickness of the iron thin film that was formed from 2 nm to 4 nm. Various measurements and evaluations were performed in the same way as in Example 1.

The obtained fibrous carbon nanostructures including CNTs had a G/D ratio of 1.9, an average diameter of 4 nm, a BET specific surface area of 1,104 m$^2$/g, and a carbon purity of 99.9%, and in measurement thereof by a Raman spectrophotometer, a radial breathing mode (RBM) peak was observed in a low wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Furthermore, the position of the bending point was at t=0.7 nm, the total specific surface area S1 was 800 m$^2$/g, the internal specific surface area S2 was 40 m$^2$/g, and S2/S1 was 0.05. Also, the amount of localized electrons at 10 K in the obtained fibrous carbon nanostructures including CNTs was 4.9×10$^{17}$/g.

The obtained dispersion liquid of surface-modified fibrous carbon nanostructures was used to evaluate dispersibility of the fibrous carbon nanostructures after surface modification treatment. The results are shown in Table 1.

Comparative Example 1

Synthesis of fibrous carbon nanostructures and production of a dispersion liquid of surface-modified fibrous carbon nanostructures were performed under the same conditions as in Example 1 with the exception that the pulling up speed during application of the coating liquid B onto the alumina thin film provided on the substrate was changed from 5 mm/s to 20 mm/s so as to change the thickness of the iron thin film that was formed from 2 nm to 5 nm. Various measurements and evaluations were performed in the same way as in Example 1.

The obtained fibrous carbon nanostructures including CNTs had a G/D ratio of 3.5, an average diameter of 4 nm, a BET specific surface area of 1,113 m$^2$/g, and a carbon purity of 99.9%, and in measurement thereof by a Raman spectrophotometer, a radial breathing mode (RBM) peak was observed in a low wavenumber region of 100 cm$^{-1}$ to 300 cm$^{-1}$, which is characteristic of single-walled carbon nanotubes. Moreover, a t-plot for the fibrous carbon nanostructures obtained from an adsorption isotherm was bent in a convex upward shape. Furthermore, the position of the bending point was at t=0.7 nm, the total specific surface area S1 was 1,120 m$^2$/g, the internal specific surface area S2 was 120 m$^2$/g, and S2/S1 was 0.11. Also, the amount of localized electrons in the obtained fibrous carbon nanostructures including CNTs at a temperature of 10K was 8.4×10$^{16}$/g.

The obtained dispersion liquid of surface-modified fibrous carbon nanostructures was used to evaluate dispersibility of the fibrous carbon nanostructures after surface modification treatment. The results are shown in Table 1.

Comparative Example 2

A dispersion liquid of surface-modified fibrous carbon nanostructures was produced using e-DIPS (single-walled carbon nanotubes) produced by Meijo Nano Carbon as an aligned aggregate of fibrous carbon nanostructures (fibrous carbon nanostructures including CNTs), and dispersibility after surface modification treatment was evaluated. The results are shown in Table 1.

In the obtained dispersion liquid of surface-modified fibrous carbon nanostructures, the surface-modified fibrous carbon nanostructures formed exceedingly large clumps, and thus it was not possible to measure the particle diameter or to form a film.

The e-DIPS produced by Meijo Nano Carbon that were used had a BET specific surface area of 900 cm$^2$/g and an amount of localized electrons at a temperature of 10 K of less than 4.0×10$^{16}$/g (less than the lower limit of detection).

TABLE 1

| | Fibrous carbon nanostructures | | | | | | Dispersibility after surface modification treatment | | | |
|---|---|---|---|---|---|---|---|---|---|---|
| | Production of catalyst substrate | | | | | | | Dispersion liquid | Film | |
| | Pulling up speed of substrate during application of coating liquid B [mm/s] | Thickness of iron thin film [nm] | Amount of localized electrons [/g] | G/D ratio | BET specific surface area [m²/g] | S2/S1 | Presence of clumps upon visual observation | Particle diameter [nm] | Presence of clumps upon microscope observation | Overall evaluation |
| Example 1 | 5 | 2 | $5.6 \times 10^{18}$ | 3.8 | 1446 | 0.18 | No | 97 | No | Excellent |
| Example 2 | 10 | 3 | $9.9 \times 10^{17}$ | 2.9 | 1191 | 0.08 | No | 136 | No | Excellent |
| Example 3 | 15 | 4 | $4.9 \times 10^{17}$ | 1.9 | 1104 | 0.05 | No | 172 | No | Excellent |
| Comparative Example 1 | 20 | 5 | $8.4 \times 10^{16}$ | 3.5 | 1113 | 0.11 | No | 211 | Yes | Poor |
| Comparative Example 2 | — | — | $<4.0 \times 10^{16}$ | — | 900 | — | Yes (all sedimented) | Cannot be measured | Cannot be evaluated | Poor |

It can be seen from Table 1 that the fibrous carbon nanostructures of Examples 1 to 3 in which the amount of localized electrons, as determined by electron spin resonance measurement at a temperature of 10 K, is not less than a specific value have excellent dispersibility after surface modification treatment.

In contrast, it can be seen that the fibrous carbon nanostructures of Comparative Examples 1 and 2 in which the amount of localized electrons, as determined by electron spin resonance measurement at a temperature of 10 K, is less than the specific value have poor dispersibility after surface modification treatment.

INDUSTRIAL APPLICABILITY

According to the present disclosure, it is possible to provide a fibrous carbon nanostructure that has excellent dispersibility after surface modification treatment.

Moreover, according to the present disclosure, it is possible to provide a surface-modified fibrous carbon nanostructure that has excellent dispersibility.

The invention claimed is:

1. A fibrous carbon nanostructure comprising a carbon nanotube, having an amount of localized electrons of $1.0 \times 10^{17}$/g or more as determined by electron spin resonance measurement at a temperature of 10 K, and having a G/D ratio of G band peak intensity relative to D band peak intensity in a Raman spectrum of not less than 0.5 and not more than 5.0.

2. The fibrous carbon nanostructure according to claim 1, wherein the amount of localized electrons is less than $1.0 \times 10^{19}$/g.

3. The fibrous carbon nanostructure according to claim 1, wherein a t-plot for the fibrous carbon nanostructure obtained from an adsorption isotherm exhibits a convex upward shape.

4. The fibrous carbon nanostructure according to claim 1, wherein the carbon nanotube includes a single-walled carbon nanotube.

5. A method of producing a surface-modified fibrous carbon nanostructure comprising performing surface modification treatment of the fibrous carbon nanostructure according to claim 1 to obtain a surface-modified fibrous carbon nanostructure.

6. The method of producing a surface-modified fibrous carbon nanostructure according to claim 5, wherein the surface modification treatment is wet oxidation treatment.

7. The fibrous carbon nanostructure according to claim 1, wherein an average diameter is 3 nm or more.

* * * * *